(12) United States Patent
Bittner

(10) Patent No.: US 6,418,278 B1
(45) Date of Patent: Jul. 9, 2002

(54) CAMERA SHUTTER SYSTEM

(75) Inventor: Wilfried Bittner, Tsuen Wan (HK)

(73) Assignee: Concord Camera Corp., Hollywood, FL (US)

( * ) Notice: Subject to any disclaimer, the term of this patent is extended or adjusted under 35 U.S.C. 154(b) by 0 days.

(21) Appl. No.: 09/524,154

(22) Filed: Mar. 14, 2000

(51) Int. Cl.$^7$ .............................. G03B 9/70; G03B 9/10
(52) U.S. Cl. ...................... 396/195; 396/180; 396/459; 396/493
(58) Field of Search ................................ 396/180, 195, 396/458, 459, 460, 493

(56) References Cited

U.S. PATENT DOCUMENTS

| | | | | |
|---|---|---|---|---|
| 2,307,297 A | * | 1/1943 | Phillimore ................... 396/495 |
| 2,571,756 A | * | 10/1951 | Pribus ......................... 396/493 |
| 3,014,417 A | * | 12/1961 | Maiershofer ................ 396/493 |
| 3,033,093 A | | 5/1962 | Stimson et al. ................ 95/64 |
| 3,645,189 A | | 2/1972 | Rentschler et al. ....... 95/11.5 R |
| 3,648,588 A | | 3/1972 | Alfredsson et al. ......... 95/53 R |
| 3,707,118 A | | 12/1972 | Stoneham et al. ............. 95/62 |
| 3,709,127 A | * | 1/1973 | Milanese et al. ............ 396/493 |
| 3,820,138 A | | 6/1974 | Horton ........................ 354/142 |
| 3,848,895 A | | 11/1974 | Christopher ............ 280/478 R |
| 3,848,985 A | | 11/1974 | Bennett ......................... 354/41 |
| 4,063,263 A | | 12/1977 | Krewalk, Sr. ................ 354/253 |
| 4,139,295 A | | 2/1979 | Matsumoto .................. 354/246 |
| 4,201,458 A | | 5/1980 | Viering ........................ 354/136 |
| 4,354,753 A | | 10/1982 | Tenne et al. ................. 354/232 |
| 4,527,876 A | * | 7/1985 | Tanaka et al. ............... 396/452 |
| 4,668,067 A | | 5/1987 | Simon et al. ................. 354/246 |
| 4,920,372 A | | 4/1990 | Nakagawa et al. .......... 354/412 |
| 5,034,761 A | | 7/1991 | Jones .......................... 354/129 |
| 5,255,037 A | * | 10/1993 | Kobayashi ................... 396/459 |
| 5,296,885 A | | 3/1994 | Sangregory et al. ......... 354/230 |
| 5,602,610 A | * | 2/1997 | Akimoto et al. ............. 396/493 |
| 5,689,733 A | | 11/1997 | Zawodny et al. ............... 396/6 |
| 5,708,885 A | | 1/1998 | Normura et al. ............. 396/355 |
| 5,717,970 A | | 2/1998 | Byrant et al. ................ 396/502 |

FOREIGN PATENT DOCUMENTS

DE        40 09 794 A1    12/1990

* cited by examiner

Primary Examiner—Alan A. Mathews
(74) Attorney, Agent, or Firm—Woodcock Washburn LLP

(57) ABSTRACT

The camera of this invention includes an improved shutter system that has the same shutter waveform when a flash is employed and when a flash is not employed. In a preferred embodiment, the shutter system includes a shutter that is rotatably mounted to the camera and a shutter opening over which the shutter blade is disposed. A slidable plate in which a first aperture and a second aperture are disposed is coupled to the camera, so that the first aperture is disposed between the first shutter opening and the lens of the camera prior to taking a picture with the camera. The first aperture is preferably smaller than the second aperture. When a picture is taken, the shutter blade moves to uncover the shutter opening, and when the shutter opening is uncovered the shutter blade causes the slidable plate to slide with respect to the shutter opening so that the second larger aperture is disposed between the shutter opening and the camera lens. If a flash is used while taking a picture, the flash illuminates while the second aperture is disposed over the shutter opening. The shutter blade then returns to cover the shutter opening. As the shutter blade returns to cover the shutter opening, the shutter blade causes the slidable plate to move, so that the first aperture is disposed over the shutter opening.

33 Claims, 7 Drawing Sheets

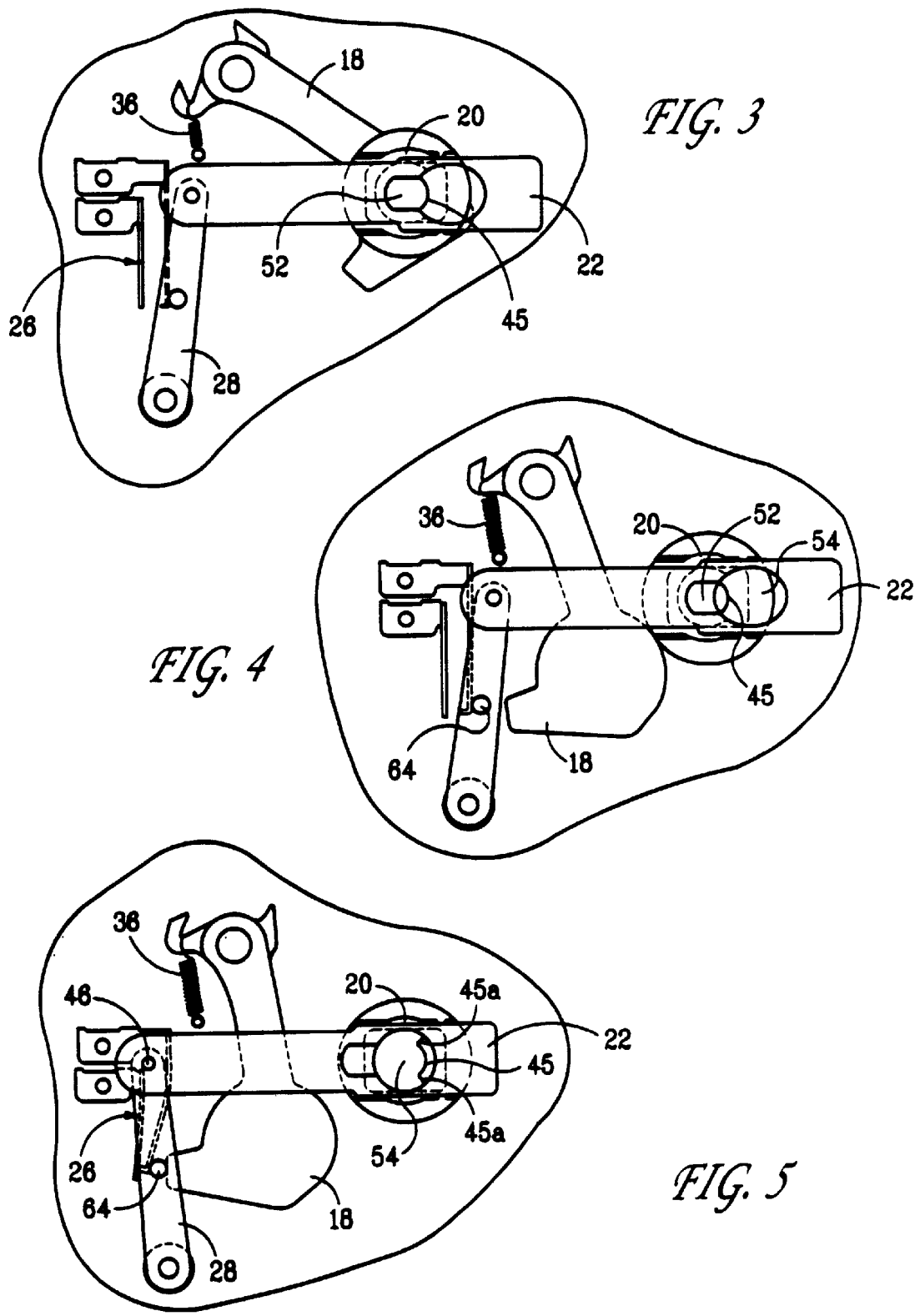

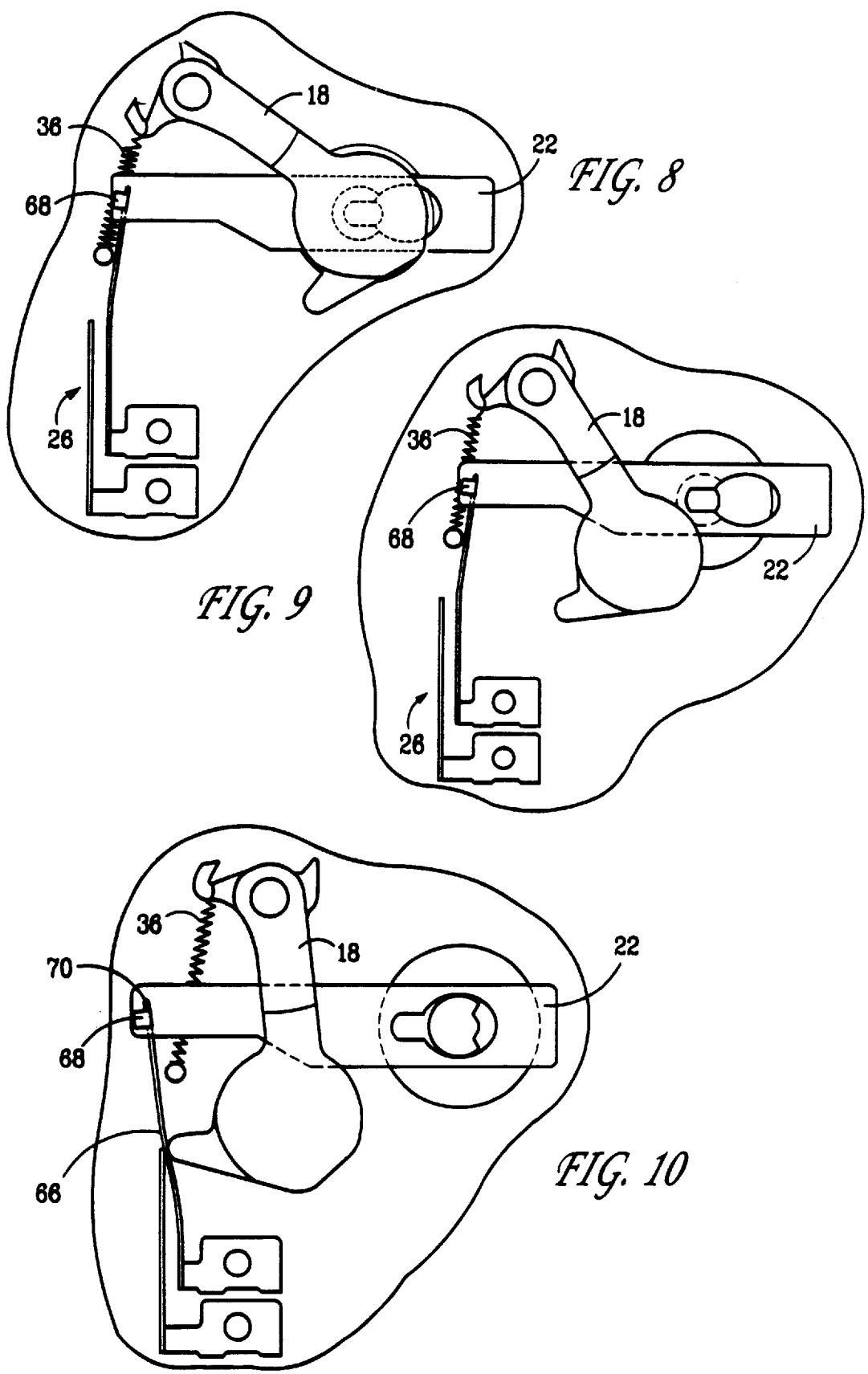

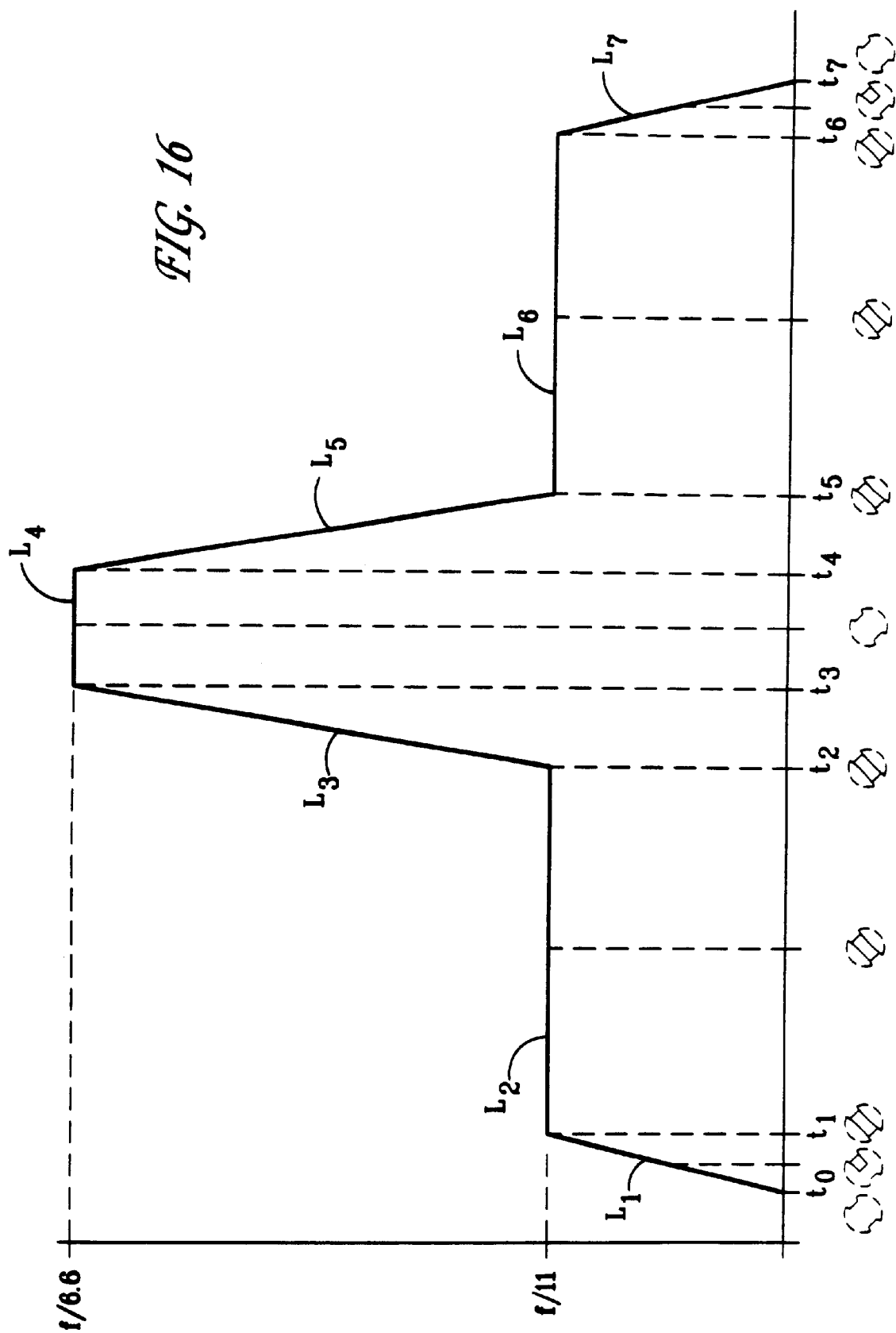

CAMERA SHUTTER SYSTEM

BACKGROUND OF THE INVENTION

The camera of this invention includes an improved shutter system that has a single-speed shutter system and preferably a two step exposure system.

Typically, a camera has a shutter system that permits light to enter the camera to expose the film to light reflected from an object whose picture is being taken with the camera. The shutter system may include a shutter blade that is pivotally mounted to the camera over a shutter opening. The film is disposed behind the shutter opening. In order to expose the film, the shutter blade moves from a closed position, in which it covers the shutter opening, to an open position, in which it uncovers the shutter opening. The shutter blade will then return to its closed position.

As is generally known, shutter systems function to control the amount of light to which the film is exposed. Although a variety of shutter systems have been designed, they can be broadly classified as either a manual or automatic type of shutter system.

In a manual type system, the camera user operates a manual switch to select a desired exposure level or shutter speed. Alternatively, a camera may employ an automatic system that has a magnetic switch for setting the exposure level based on the sensing of the ambient light level.

While both of these systems work well, they each have their drawbacks. The manual type system cannot have an "autoflash" feature. A drawback of th automatic system is that it is relatively expensive and, is therefore, not practical for relatively low cost cameras.

Typically, cameras transmit light through different size apertures or vary the shutter speed in order to expose the film depending on whether the camera flash is being employed. Moreover, some cameras have a variable aperture that can be varied in size, so that an optimum aperture size can be selected based upon the lighting conditions. Instead of varying the aperture size, the shutter speed can be varied in order to expose the film depending on whether a flash is used. A relatively fast speed could be employed with the flash, and a relatively slow speed could be employed without the flash.

Single-speed shutter systems are, typically, inexpensive. Thus, some shutter systems employ a single-speed shutter in order to reduce the cost of a camera. However, a single speed design has not yet been developed that satisfies all of the requirements of indoor and outdoor photography.

The camera of this invention has an improved single speed shutter system that is relatively inexpensive, but is able to operate effectively in a wide range of lighting conditions.

SUMMARY OF THE INVENTION

The camera of this invention has an improved shutter system that has substantially the same shutter waveform when a flash is employed and when a flash is not employed. Preferably, the camera of this invention has a fixed single-speed shutter and a two step exposure system. The two step exposure system may in one embodiment, include two lens apertures of different size through which light is transmitted when the picture is taken. In a preferred embodiment, the film is exposed to light through the larger lens aperture for about 2 msec. and the smaller lens aperture for amount 10 msec. The flash, if used, is triggered so that the larger lens aperture transmits light from the flash. A light sensing circuit or auto flash feature may be employed to enable the flash to fire when ambient conditions have a relatively low light level. When taking a picture in relative low ambient light conditions, such as indoors, the large lens aperture allows sufficient exposure of the film with the limited amount of light from the camera flash. In contrast, when taking a picture in relatively high ambient light conditions, such as outdoors, the smaller lens aperture provides for better depth-of-field and matches the exposure level to the ambient conditions.

Although exposure through the smaller lens aperture is preferred for non-flash pictures and exposure through the larger lens aperture is preferred for flash pictures, exposing the film through both apertures, whether or not a flash is employed, does not significantly degrade the quality of the exposure. Therefore, this two-step exposure system provides a relatively economical shutter system that produces good quality exposures over a wide range of lighting conditions. More specifically, when the flash is not employed, only daylight travels through the aperture. As the film is exposed to light traveling through the smaller aperture, good lens performance and depth of field is achieved. Although exposure through the larger aperture is not preferred when the flash is not employed, the relatively small exposure time through the larger aperture does not significantly degrade the photograph. Moreover, when pictures are taken with the flash, the film is first exposed through the small aperture to ambient light and when the flash fires the film is exposed to light from the flash through the large aperture. Although exposure through the smaller aperture is not preferable when the flash issued, this exposure through the smaller aperture does not contribute significantly to the overall exposure of the film. Thus, the camera of this invention has a two step exposure system that provides good quality photographs when a flash is employed and not employed and is relatively economical.

The camera in which this improved shutter system is employed may include a main body on which various components of the camera are disposed and that is enclosed by a camera casing. The camera may further include a film cassette compartment, disposed on one lateral end of the camera, and a film spool mounted on the other lateral end. A film cassette can be received into the film cassette compartment, and film may be preloaded by winding the film around the film spool prior to exposing the film. A film path is disposed between the film cassette compartment and the film spool.

A shutter opening is disposed within the main body. Light is transmitted through the shutter opening to expose the film within the film path. A shutter blade is rotatably mounted to the camera and mechanically coupled to a striker. The striker is linked to the picture taking mechanism. The shutter blade is rotatable from a covered position, in which it covers the shutter opening to prevent light from being transmitted through the shutter opening to expose the film, to an uncovered position, in which the s utter opening is uncovered and light is permitted to enter the shutter opening to expose the film. When a picture is taken with the camera, the striker causes the shutter blade to rotate from the covered position to the uncovered position and back to the covered position. Preferably, the shutter blade rotates at the same speed when a picture is taken with or without a flash.

A plate may be coupled to the main body, so that it can move between a first position and a second position, in response to movement of the shutter blade between the covered position and the uncovered position. The plate may have an aperture that defines a first aperture and a second aperture through which light can be transmitted to expose the film. Preferably, the first aperture has a smaller cross sectional area than the second aperture. In its first position, the first aperture is disposed over the shutter opening, so that light is transmitted through the first aperture to the shutter opening. Conversely, in the second position, the second aperture is disposed over the shutter opening, so that light can be transmitted through the larger second aperture and shutter opening.

When a picture is taken with the camera, the shutter blade moves from the covered position to the uncovered position. As the shutter blade is moving and the shutter opening becomes uncovered, light is transmitted through the first aperture and the shutter opening to expose the film. Eventually, the movement of the shutter blade causes the plate, which is responsive to the movement of the shutter blade, to slide so that the second aperture of the plate is disposed over the shutter opening. In this position, light is transmitted through the larger second aperture. As the shutter blade moves back to its covered position, the plate moves back to its first position to expose the film to light through the smaller first aperture.

The blade and the plate move in the same sequence and at the same speed when the flash is employed and when the flash is not employed. Preferably, the first and the second apertures are sized, so that when a flash is employed and when a flash is not employed, the film is exposed to a sufficient amount of light to expose the film, but not so much light so as to degrade the quality of the exposure.

The camera further has a pair of flash contacts that are coupled to the flash and an electrical circuit that triggers the flash. The contacts have a closed position and an open position. In the closed position, the contacts provide power to the flash, and in the open position the contacts interrupt power to the flash. The contacts are preferably normally open and are mounted to the main body of the camera. The contacts are responsive to movement of the shutter blade so that the contacts move from the open position, when the shutter blade is in the covered position, to the closed position, when the shutter blade is in the uncovered position. The shutter blade may physically contact the contacts and push the contacts to the closed position.

In a preferred embodiment, the camera further comprises a lever coupled to the slidable plate and the pair of flash contacts. The lever may be rotatably mounted to the camera and rotatable between a first position and a second position. The ever resides in the first position before a picture is taken and when the small aperture of the slidable plate is disposed over the shutter opening. When the shutter blade rotates it preferably contacts the lever to cause the lever to rotate and thereby move the slidable plate to its second position. As the shutter blade returns to its covered position, the shutter blade rotates back to its first position. As the lever rotates, the slidable plate returns to its first position.

In an alternative preferred embodiment of this invention, the slidable plate is engaged with the flash contacts. In this embodiment, at least one of the flash contacts is flexibly mounted to the camera, such that this flash contact is fixed at one end and free at another end. The shutter blade contacts the free end of the flexibly mounted flash contact, so that this free end of the contact deflects when the shutter blade contacts it. If the slidable plate is mounted to the free end of the contact, the slidable plate moves with the movement of this flexibly mounted contact. The slidable plate moves from its first position to its second position as the contact moves in response to activation by the shutter blade. Upon the shutter blade returning to its covered position, the flash contact rotates and thereby moves the slidable plate to its first position.

Other features of the invention are provided below.

BRIEF DESCRIPTION OF THE DRAWINGS

FIG. 3 is a diagrammatical view of the preferred embodiment of FIG. 1 with the shutter blade in a closed position;

FIG. 4 is a diagrammatical view of the preferred embodiment of FIG. 1 with the shutter blade in an open position;

FIG. 5 is a diagrammatical view of the preferred embodiment of FIG. 5 with the shutter blade activating a camera flash;

FIG. 8 is a diagrammatical view of the embodiment of FIG. 7 with the shutter blade in a closed position;

FIG. 9 is a diagrammatical view of the embodiment of FIG. 7 with the shutter blade in an open position;

FIG. 10 is a diagrammatical view of the embodiment of FIG. 7 with the flash contacts closed;

FIG. 16 is graph illustrating the shutter waveform of the embodiment of FIG. 11.

DETAILED DESCRIPTION OF PREFERRED EMBODIMENTS

Figure 1:
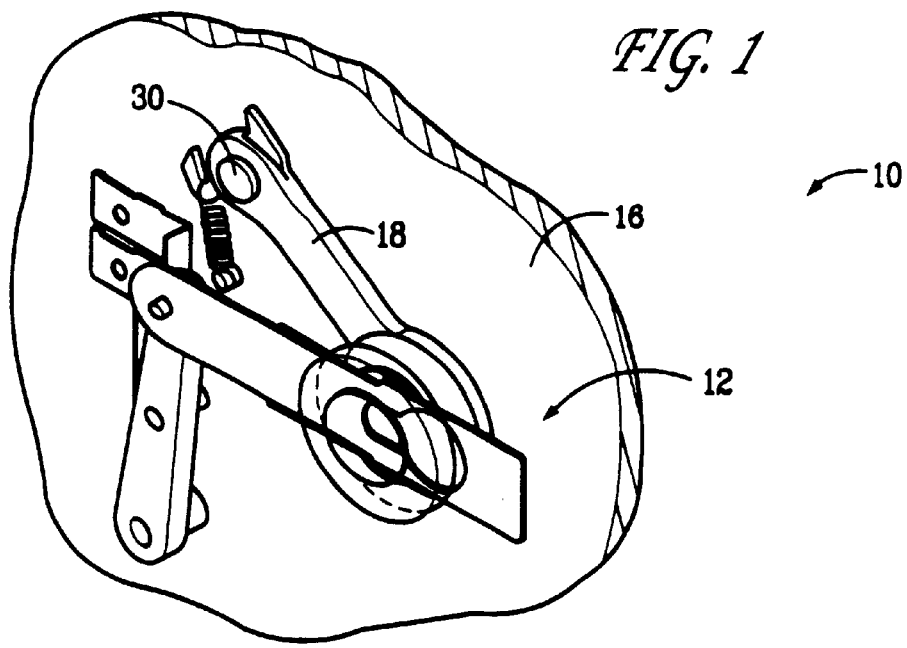
FIG. 1 is a diagrammatical view of a shutter system according to a first preferred embodiment of this invention.

The camera 10 of this invention includes a shutter system 12 having substantially the same shutter waveform whether the picture is taken with or without the flash 14. The shutter system 12 achieves this by transmitting light through the same apertures to expose film when a flash is being employed and when a flash is not being employed. According to the camera 10 of this invention, the shutter speed is fixed and the apertures through which the film is exposed are the same when a flash is employed and when a flash is not employed.

FIGS. 1–6 depict a first preferred embodiment of the camera 10. In addition to having a flash 14 and a shutter system 12, the camera 10 further includes a main body 16 that is internal to the camera on which many of the components of the camera, such as the film metering system (not shown), the shutter system 12 and others are mounted. In some embodiments the main body 16 may be shaped such that it includes at least a portion of the exterior of the camera 10.

A shutter opening 17 is disposed in the main body 16. Light can be transmitted through the shutter opening 17 to a film exposing area. In order to expose the film light must pass through this shutter opening 17. Although not shown, the camera 10 also includes a film cassette compartment and a film spool compartment disposed on opposing sides of the camera. A film cassette is housed in the film cassette compartment, and a rotatable film spool may be mounted within the film spool compartment. The film exposing area is disposed between the film cassette compartment and the film spool compartment. In order to preload the film, the film is advanced from the film cassette across the film exposing area and wound around the film spool. When pictures are taken with the camera, the film is rewound from the film exposing area into the film cassette until the last exposure is taken. An example of a camera that has these features is shown in U.S. Pat. No. 5,689,733, which is hereby incorporated by reference.

Figure 2:
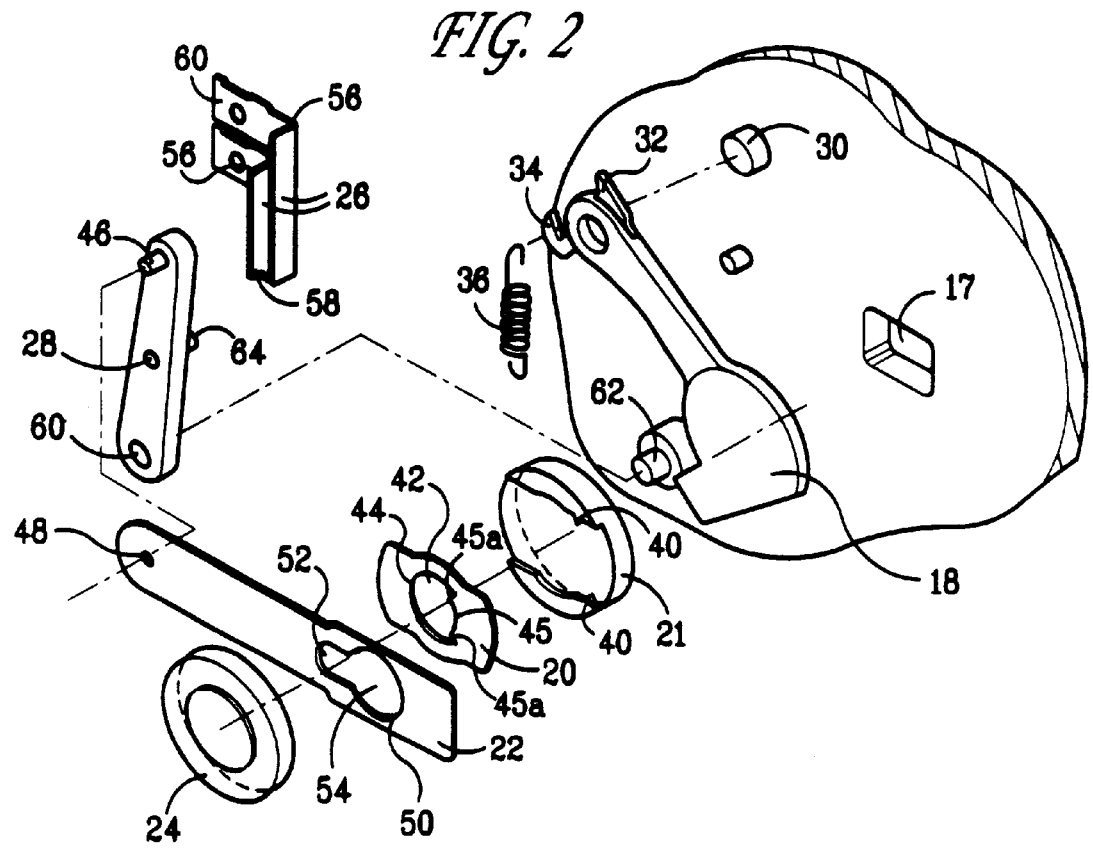
FIG. 2 is an assembly drawing of the preferred embodiment of FIG. 1.

As best shown in FIG. 2, the shutter system 16 includes a shutter blade 18, a mask 20, a first lens 21, a sliding plate 22, a second lens 24, a pair of flash contacts 26 and a lever 28. The shutter blade 18 is rotatably mounted to the main body 16 of the camera 10 about a pivot pin 30, as shown in FIGS. 1 and 2. The shutter blade 18 includes a finger 32 and a hook 34 extending from an end of the shutter blade 18. The finger 32 is for engagement with a striker or other mechanism that is activated upon taking a picture with the camera to cause the shutter blade 18 to rotate. A spring 36 is mounted to the main body 16 and coupled to the hook 34 to bias the shutter blade 18 to rotate in the counter clockwise direction, as shown in FIGS. 1 and 2. As is described in further detail below, when a picture is taken, the picture taking mechanism contacts the finger 32 of the shutter blade 18 to push the shutter blade 18 to rotate in the clockwise direction against the bias of the spring 36.

The shutter blade 18 is disposed between the shutter opening 17 and the first lens 21 and rotates between a covered position, as shown in FIGS. 1 and 3 and an uncovered position, as is best shown in FIG. 5. In its covered position, the shutter blade 18 covers the shutter opening 17, so that light does not enter the shutter opening 17 and thereby expose the film. While in the uncovered position, the shutter blade 18 permits light to be transmitted through the shutter opening 17 and thereby expose the film. Before a picture is taken with the camera, the shutter blade 18 is in the covered position.

In a preferred embodiment, the first lens 21 is manufactured from molded transparent plastic. In other embodiments the first lens 21 may be glass. The first lens 21 is mounted between the shutter blade 18 and the mask 20 and may have a pair of ridges 40 for mounting the mask 20 over the first lens 21. A second lens 24 is mounted on a side of the mask 20 that opposes the side of the mask 20 the first lens 21 is mounted. Light from outside of the camera travels through the second lens 24, to the mask 20, to the first lens 21, through the shutter opening 17 and to the film. The mask 20 is constructed from a non-transparent material, so that light cannot be transmitted through it. The mask has, however, an aperture 42 through which light from outside of the camera can be transmitted to the first lens 21 and to the shutter opening 17, depending upon the position of the shutter blade 18, as referenced above.

In the preferred embodiment of FIGS. 1–5, the mask aperture 42 is defined in part by a shape that has a first portion 44 that is circular in shape and that has a first radius. The mask aperture 42 is further defined by a second portion 45 that is also circular. This second portion 45 has a second radius that is smaller than the first radius. The first and the second radii extend from the geometric center of the mask 20. As shown in FIG. 2, the first portion 44 extends a little more than 180 degrees around the circular cut out portion that defines the mask aperture 42. The mask further has connecting portions 45a that connect the first portion 44 to the second portion 45. As shown in FIG. 2, these connecting portions 45a are straight lines.

Disposed over the mask 20 and behind the second lens 24 is the plate 22. In the embodiment depicted in FIGS. 1–5, the plate is mounted to the lever 28. A variety of fastening techniques may be employed to couple the plate to the lever 28. By way of example, the plate 22 is mounted to the lever 28 with a pin 46 extending from the lever 28 and into a hole 48, disposed in the plate 22. The pin 46 is pivotally mounted in the hole 48. This fastening technique is provided by way of example and not by way of limitation. Further, the plate 22 has a cut out structure 50 that defines a first aperture 52 and a second aperture 54 for exposing the film. The first aperture 52 is smaller in size than the second aperture. Each of these apertures 52, 54 is selectively disposed between the second lens 24 and the mask 20 during the picture taking sequence, as is described in further detail below.

This plate 22 is slidable between a first position, as shown in FIGS. 3 and 4, to a second position, as shown in FIG. 5. In its first position, the first aperture 52 is disposed between the second lens 24 and the mask 20, so that light can be transmitted through the second lens 24, the first aperture 52 and the first lens 21 to expose the film, when a picture is taken. The second position of the plate 22 is best illustrated in FIG. 5. In this second position, the plate 22 has moved relative to the second lens 24, so that the second aperture 54 is disposed between the second lens 24 and the first lens 21. Consequently, light is transmitted through the second lens 24, the second aperture 54 and the first lens 21 to expose film during the picture taking sequence. Since the first aperture 52 is smaller in size than the second aperture 54, a smaller amount of light will be transmitted through the first aperture 52 then the second aperture 54. Further, as is described in more detail below, the plate 22 moves to its second position, so that when a flash is employed, light will be transmitted through the larger second aperture 54 to expose the film.

As can be seen by comparing FIGS. 4 and 5, the movement of the plate 22 is translational in that the plate 22 slides from its first position to its second position. However, the plate 22 could be mounted in a variety of other manners so that it moves along an arc or in another motion from its first position to its second position. Movement of the plate from its first position to its second position occurs when a picture is taken with the camera in response to activation of the shutter system 10 by depressing a picture taking button or other similar mechanism. As is described in more detail below, the shutter blade 18 moves in response to activation of the picture taking mechanism from its covered position to its uncovered position. As the shutter blade 18 moves, the shutter blade 18 contacts the lever 28 and pushes the lever to move the slidable plate 22 from its first position to its second position. This is best shown in FIGS. 4 and 5. Thus, when the shutter blade 18 is in its covered position, the plate 22 is in its first position, and when the shutter blade 18 is in its uncovered position, the plate 22 is in its second position.

The pair of flash contacts 26 are mounted to the camera so that they act as leaf springs. In particular, the flash contacts 26 are fixed to the main body of the camera at a first end 56. The contacts 26 may be fixed to the main body at their first end with an adhesive, solder or with a variety of other fastening techniques. The contacts 26 also have a second end 58 that is not fixed and is free to move in response to movement of the shutter blade 18 from its first position to its second position. Coupled to the flash contacts 26 is an electrical circuit that includes at least a flash, a conductor 60 and a source of electrical power, such as a battery. The camera also has a light sensing circuit that provides an auto-flash feature. The light sensing circuit senses ambient light conditions and provides electrical power to the flash when ambient lighting conditions are below a threshold level.

The contacts have an open position as shown in FIGS. 3 4, and a closed position, as shown in FIG. 5. In the open position the flash contacts 26 do not contact each other. Conversely, in their closed position, the flash contacts conduct electricity to the circuit to trigger the flash. As is best seen by comparing FIGS. 4 and 5, the contacts 26 move from their open position to their closed position in response to movement of the shutter blade 18. It will also be appreciated that the contacts 26 move to their closed position when the plate 22 moves to its second position. Thus, when the flash is fired, the larger second aperture 54 is disposed behind the second lens 24 to transmit a relatively larger amount of light to expose the film. It will be appreciated that since the contacts 26 act as leaf spring s, the contacts 26 will move back to their open position after the shutter blade 18 moves back to its covered position. The contacts 26 serve as an electrical switch so that the flash is fired when the plate 22 is in its second position. Other electrical switching means other than the contacts 26 may be employed to fire the flash in response to movement of the shutter blade 18.

The lever 28 is rotatably mounted to the main body. The lever has an opening 60 through which a member 62 extending from the main body is inserted to affix the lever 28 to the main body, as is best shown in FIG. 2. A rotatable fit is employed between the member 62 and the opening 60 to couple the lever 28 to the main body. The lever 28 is rotatably mounted to the main body, so that the lever 28 is free to rotate about the member 62. The plate 22, as described above, is coupled to the lever 28. As is best shown in FIGS. 3–5, the lever 28 moves in response to movement of the shutter blade 18 to move the plate 22 from its first rotational position to its second rotational position.

Extending from the lever 28 is a finger 64. This finger 64 is integrally formed from with the lever 28 from molded plastic. The finger 64 is engageable with the contacts 26 to push the contacts together and into their closed position in response to movement of the shutter blade 18. This is best illustrated in FIGS. 4 and 5, as the finger 64 pushes the contacts 26 together as it reaches its second rotational position.

Operation of the First Perferred Embodiment

Figure 6:
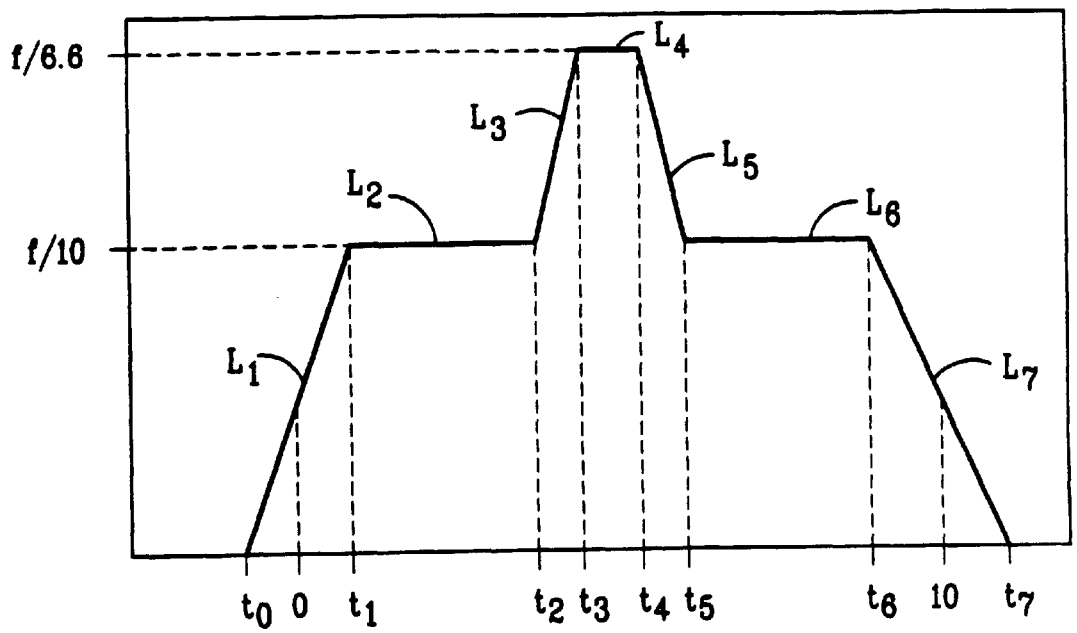
FIG. 6 is a graph illustrating the shutter waveform of the preferred embodiment of FIG. 1.

Operation of the first preferred embodiment of this invention is best illustrated in FIGS. 3–5 and best understood with reference to FIG. 6. Before taking a picture with the camera 10, film is loaded into the camera, so that it is disposed within the film exposing area behind the shutter opening 17 described above. The camera components are in the positions illustrated in FIG. 3. This includes the shutter blade 18 being in the covered position in which it covers the shutter opening 17 and the contacts 26 being in their open position. The plate 22 is in its first position in which the small aperture 54 is disposed between the second lens 24 and the first lens 21. The lever 28 is also disposed in its first rotational position.

In order to take a picture, the flash main switch is activated by the camera user with a button or other mechanism. Alternatively, a picture can be taken without activating the flash. Whether or not the flash is operated, the shutter system 12 follows the same sequence to expose the film. Exposure of the film without the flash being activated is described below, and is followed by a description of exposure of the film with the flash activated.

After focusing on an object, whose picture is being taken, camera user can depress or operate the picture taking mechanism. When the picture taking mechanism is activated, the striker or other mechanism will contact the shutter blade 18 to push the shutter blade 18 to rotate clockwise, as viewed in FIGS. 3 and 4. As the shutter blade 18 rotates from the covered position, the shutter opening 17 is uncovered. Light is transmitted through the second lens 24, the first aperture 52 of the plate 22, the mask 20, the first lens 21 and the shutter opening 17 to expose the film in the film exposing area, as shown in FIG. 4.

As the shutter blade 18 continues to rotate, the shutter blade 18 contacts the lever 28, as shown in FIG. 5. When the lever 28 is contacted, the lever rotates from its first rotational position to its second rotational position. When rotating from its first rotational position, the lever finger 64 engages the contacts 26 to push the contacts 26 from their open position to their closed position. However, since the flash main switch has of been selected, and therefore, activated the flash is not powered.

As shown in FIG. 5, the plate 22, which is coupled to the lever 28, moves with the lever 28, as the lever 28 moves to its second rotational position. When the plate 22 moves, the second aperture 54 moves between the second lens 24 and the first lens 21 to expose the film through the second aperture 54.

As the picture is taken, the striker activates the shutter blade 18. Once activated, the shutter blade 18 reaches its fully open position. Then, the shutter blade will move back to the covered position shown in FIG. 3 due to the biasing of the spring 36. As the shutter blade 18 returns to the covered position, the lever 28 is released and moves back to its first rotational position. In response to movement of the lever 28, the contacts 26 return to the open position. The plate 22 returns to its first position in which the first aperture 52 is disposed between the first lens 21 and the second lens 24.

When a picture is to be taken with the camera flash, the cam era user will make the flash operative by depressing a button or similar mechanism. The light sensing circuit or auto flash feature determines when the flash is to be used by sensing ambient lighting conditions and then powering the flash. The picture taking sequence will occur, as described above, with the exception that when the contacts 26 are closed, due to the movement of the shutter blade 18 and the lever 28, electrical power is supplied to the flash firing electrical circuit. Consequently, the flash illuminates. This illumination occurs after the plate 22 moves in response to movement of the lever 28 to place the second larger aperture 54 between the first lens 21 and the second lens 24. Since both the illumination of the flash and the movement of the plate 22 are controlled by the movement of the lever 28 and the shutter blade 18, it will be appreciated that the flash does not illuminate until the second aperture 54 is disposed between the first lens 21 and the second lens 24. With the larger aperture 54 disposed between the first lens 21 and the second lens 24, the film is able to receive sufficient light from the flash to expose the film As described above, the shutter sequence is the same whether or not the flash is employed. Because of this, the camera of this invention is able to expose film through the same apertures with a shutter blade that moves at a fixed speed. The shutter system of this invention has the same shutter waveform whether or not a flash is being employed.

During this picture taking sequence the first aperture 52 of the plate 22 is disposed between the first and the second lenses during the majority of time that the shutter blade 18 is in the uncovered position. This is best understood with reference to FIG. 6, which is a graphical representation of the shutter waveform or the amount of light entering the camera versus the movement of the shutter blade 18 and the slidable plate 22 when a flash is employed. The amount of light is depicted on the vertical axis.

As depicted in the graph, the camera is ready to take a picture and the camera components described above are in the positions shown in FIG. 3 at the time $t_0$. The picture taking mechanism is activated at time $t_0$ and the shutter blade 18 begins to rotate to uncover the shutter opening 17. As the shutter opening 17 is being uncovered, light is transmitted through the smaller first aperture 52 and the shutter opening 17. Continue movement of the shutter blade 18 increases the portion of the shutter opening 17 that is covered and the amount of light being transmitted through the shutter opening 17. This movement of the shutter blade 18 is depicted by the increasing line $L_1$. As shown, the amount of light increases as the uncovered portion of the shutter opening 17 increases in size. At time $t_1$ the shutter blade has completely uncovered the shutter opening 17, but has not rotated enough to cause the plate 22 to move. Therefore, from the time $t_1$ until the time $t_2$ light is being transmitted through the smaller first aperture 52 and the shutter opening 17. On the graph this is depicted as a horizontal line $L_2$ which represents a constant light level.

Once the shutter blade 18 has rotated sufficiently, the slidable plate 22 begins to move, as described above. Movement of the slidable plate 22 moves the larger second aperture 54 over the shutter opening 17. As the plate 22 moves from disposing the first aperture 52 over the shutter opening 17 to the second aperture 54 over the shutter opening 17, the size of the aperture increases until the second aperture 54 is disposed directly over the shutter opening 17, which is denoted as time $t_3$. This is best understood with reference to FIGS. 3 and 4, where the movement of the plate 22 is illustrated. Graphically, the movement of the slidable plate 22 is depicted as the line $L_3$. As shown, the amount of light being transmitted through the shutter opening 17 increases as the slidable plate 22 moves.

Line $L_4$ is a horizontal line depicting the light entering the camera while the second aperture 54 is disposed directly over the shutter opening 17. The amount of light entering the camera is equivalent to the amount of light entering through an aperture corresponding to f/6.6. It is during this time period, the time from $t_3$ until $t_4$ that the flash is activated, so that light can be transmitted through the larger second aperture 54. In a preferred embodiment, the length of the flash is about 1 ms.

The shutter blade 18 begins its return stroke at about the midpoint of the line $L_4$. Rotation of shutter blade 18 back to the covered position pulls the slidable plate 22, and the plate 22 moves back to dispose the smaller first aperture 52 over the shutter opening 17. This is represented by the line $L_5$. As best understood with reference to FIGS. 3 and 4, as the shutter blade 18 moves along its return stroke, the size of the aperture disposed over the shutter opening 17 becomes increasingly smaller. Therefore, the line $L_5$ is sloped downward. Eventually, the slidable plate returns to its first position at time $t_5$ in which the small aperture 52 is disposed over the shutter opening 17. This is represented by the line $L_6$ and is a horizontal line at the value of f/10. Once the edge of the shutter blade 18 reaches the shutter opening 17 at time $t_6$ and begins to cover the shutter opening 17 on the return stroke, the light value decreases, as represented by the line $L_7$. When the shutter blade 18 reaches the covered position, light is prevented from entering the shutter opening 17. This is represented graphically by the line $L_7$ which reaches the horizontal axis at time $t_7$. At this point the picture taking sequence is complete. In a preferred embodiment, the effective length of film exposure is about 10 ms., which is depicted on the graph.

The shutter system depicts this waveform when a picture is taken with a flash and without a flash. This waveform permits the shutter system to exhibit the same motion to pass light through the same size apertures when a flash is employed and when a flash is not employed. Thus, the shutter system of this invention moves in the same sequence, at the same speed and uses the same size apertures when a flash is used and when a flash is not used.

Second Preferred Embodiment

A second preferred embodiment of this invention is depicted in FIGS. 7–10. This second preferred embodiment is similar to the first preferred embodiment except that the second preferred embodiment does not employ a lever 28. Rather, the slidable plate 22 is coupled directly to the flash contacts 26, so that the plate 22 is directly responsive to movement of the contacts 26 in response to movement of the shutter blade 18.

Figure 7:
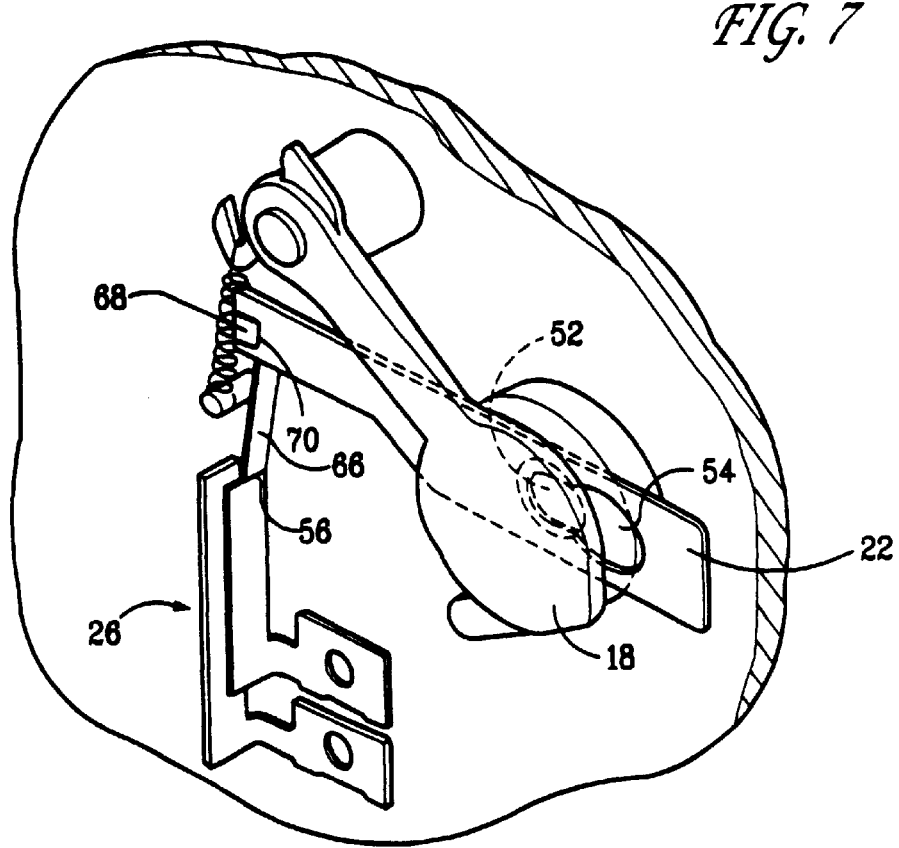
FIG. 7 is a diagrammatical view shutter system according to a second preferred embodiment of this invention.

In this embodiment one of the flash contacts 26 has an extension 66, as shown in FIGS. 7–10, that is manufactured from metal. This extension 66 has a tab 68 extending from a first longitudinal end 56 for engaging the plate 22. The plate 22 has a slot 70 for receiving the tab 68, as shown in FIG. 7. Since the slidable plate 22 is engaged with the tab 68, the slidable plate 22 will move as the contacts 26 and the extension 66 move in response to movement of the shutter blade 18.

The shutter blade 18 operates similar to that of the first embodiment described above and contacts the flash contacts 26 as the shutter blade 18 moves from the uncovered position to the covered position, as shown in FIGS. 7–10 . Upon engaging the contacts 26, the extension 66 will move with the contacts and thereby cause the slidable plate 22, to move from its first position to its second position. Otherwise this second embodiment operates similar to the first embodiment and exhibits a similar wave form.

Third Preferred Embodiment

Figure 11:
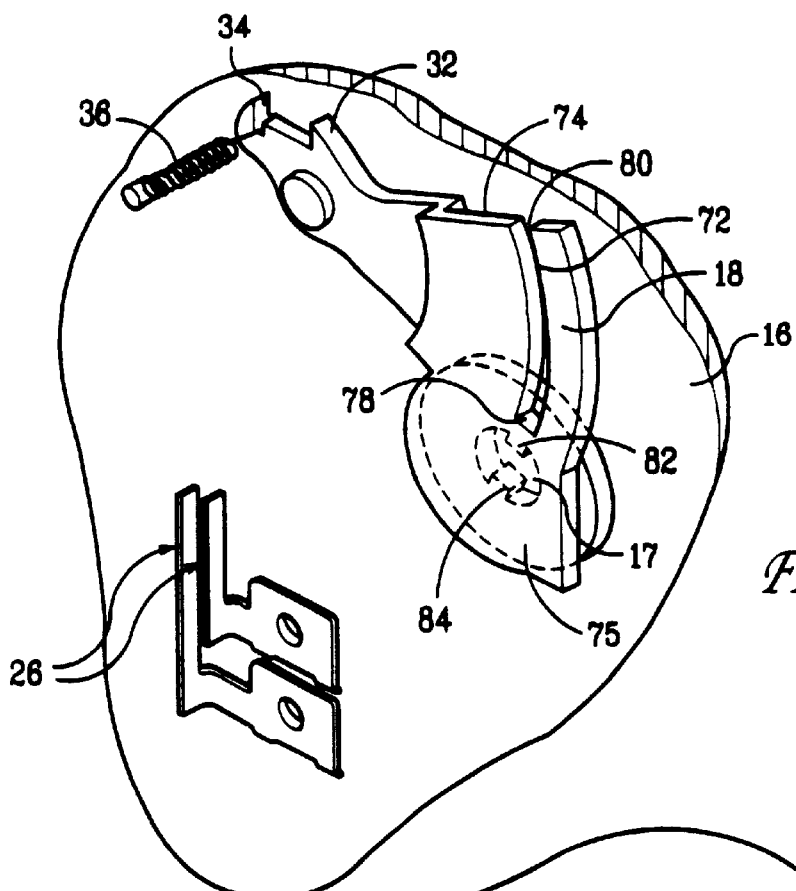
FIG. 11 is a diagrammatical view of a third preferred embodiment of a shutter system of this invention.

A third preferred embodiment of this invention, is depicted in FIGS. 11–15. In this embodiment, a slidable plate is not employed. As shown in FIG. 11, the shutter blade 18 of this embodiment has a slot 72 that has a first end 78 and a second end 80. In this embodiment, the slot 72 is an arc-shaped slot that runs from a peripheral edge 74 of the shutter blade 18 to an interior portion 75 of the shutter blade 18. The first end 78 of the slot 72 is disposed in the interior portion 75, and the second end 80 is disposed on the peripheral edge 74. The peripheral edge 74 of the shutter blade 18 to which the slot runs is the edge of the shutter blade 18 that trails the direction of motion of the shutter blade 18 from the covered position to the uncovered position. In this embodiment, the movement Of the shutter blade 18 defines the aperture through which light can enter the shutter opening 17 to expose the film.

Figure 12:
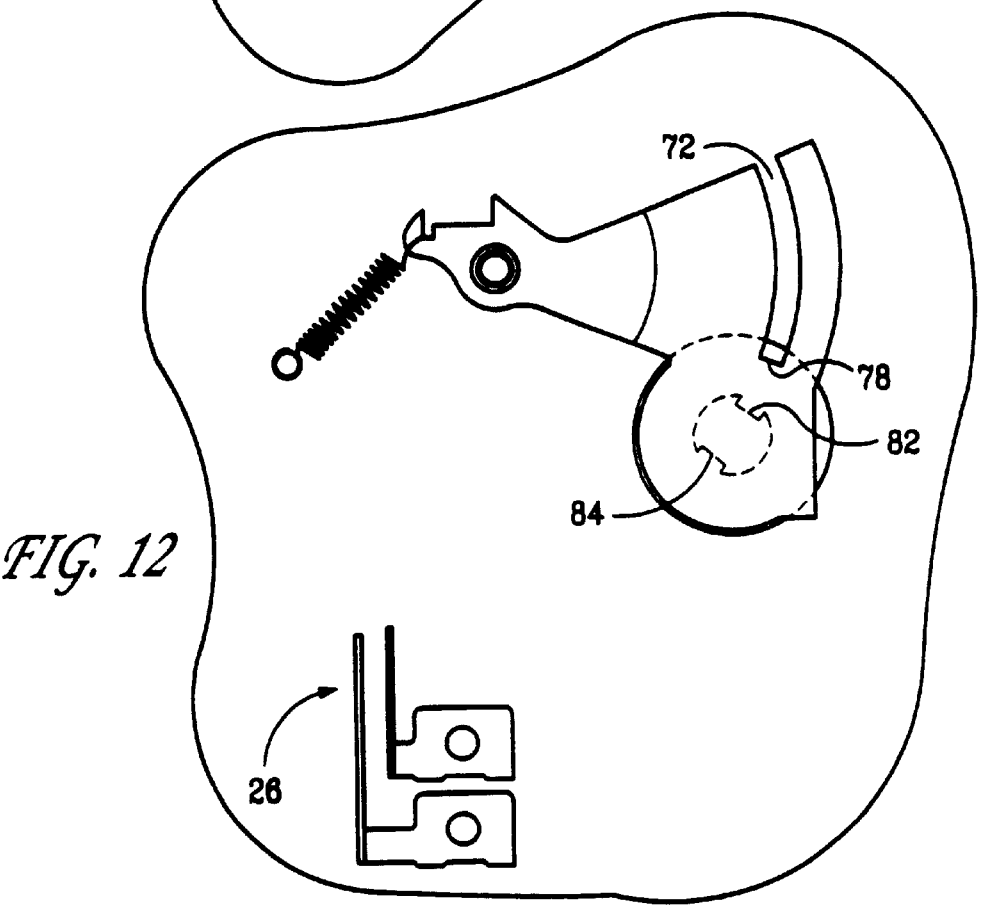
FIG. 12 is a diagrammatical view of the embodiment of FIG. 11 with the shutter blade in the covered position.

As alluded to above, the shutter blade 18 has a portion 75 into which the slot 72 does not extend. This portion 75 covers the shutter opening before a picture is taken with the camera, as shown in FIG. 12.

Figure 14:
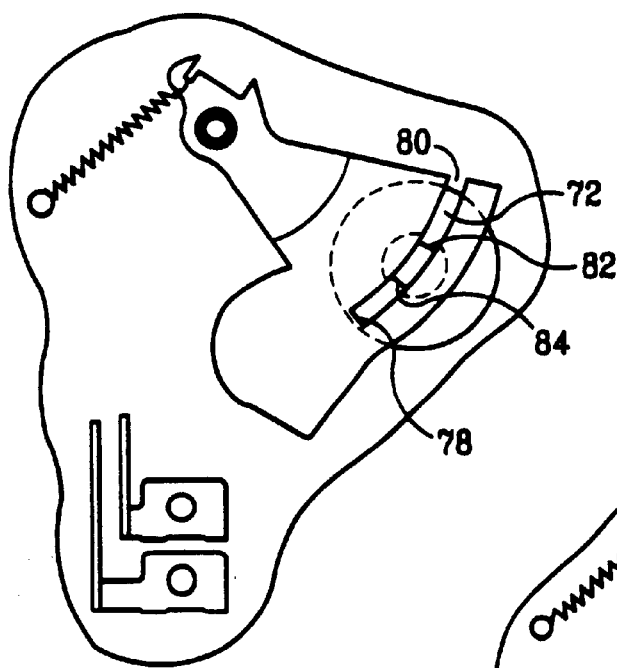
FIG. 14 is a diagrammatical view of the embodiment of FIG. 11 with the shutter blade moving to the uncovered position from the position shown in FIG. 13.

The shutter opening 17 in this third embodiment is slightly different than the shutter opening 17 in the first two embodiments. As shown, in this embodiment the shutter opening 17 is not a perfect circle. Rather, the shutter opening 17 has a first indentation 82 and a second indentation 84. The first indentation 82 and the second indentation 84 are integrally formed with the main body 16 or other structure that defines the shutter opening 17. The first indentation 82 and the second indentation 84 are disposed along the path traveled by the slot 72 of the shutter blade 18 during rotation of the shutter blade 18. Therefore, the slot 72 will travel over the first indentation 82 and then the second indentation 84 to create an aperture through which light can be transmitted to expose the film, as the shutter blade 18 rotates. The first indentation 82 and the second indentation 84 eliminate blur problems that would occur if the shutter opening 17 was a complete circle. Blur problems are the result of a non-circular opening, such as the slot, passing over a circular opening to emit light to expose the film. The first and the second indentations provide a straight surface, as opposed to a curved surface, for the slot 72 to pass over and thereby reduce the blur associated with a moving part creating an opening to expose film. Further, as shown in FIG. 14, the first and the second indentation 82, 84 are of the same width as the slot 72.

This embodiment further includes a pair of flash contacts 26, an electrical circuit and a flash similar to those described above. Also similar ti the embodiment described above, the shutter blade 18 is rotatable between a covered position and an uncovered position. When the shutter blade 18 is in the covered position, the flash contacts 26 are in the open position, as shown in FIG. 12. Upon rotation of the shutter blade 18 to the uncovered position, the shutter blade 18 urges the contacts to the closed position to illuminate the flash, as shown in FIG. 15.

Figure 13:
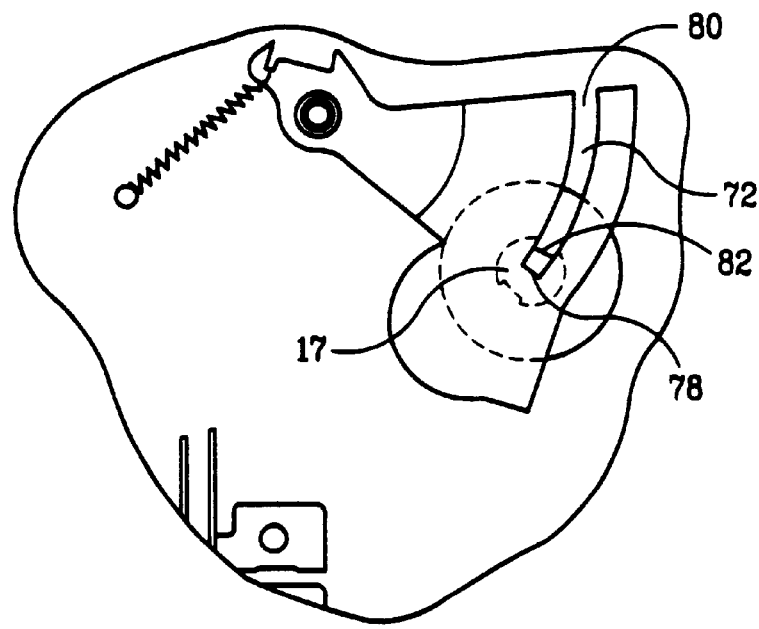
FIG. 13 is a diagrammatical view of the embodiment of FIG. 11 with the shutter blade moving to the uncovered position.

This embodiment works similar to the embodiment described above. The shutter blade 18 has a partially covered position in which at least a portion of the slot 72 is disposed over the shutter blade 18, so that the light can be transmitted through the slot 72 to the shutter opening 17. This partially covered position extends from a position in which a first end 78 of the slot 72 is disposed over the shutter opening 17 as shown in FIG. 13, until the shutter blade 18 rotates and the shutter opening 17 is completely uncovered, as shown in FIG. 15. The partially covered position further includes the position of the shutter blade 18 when the slot 72 is disposed over the shutter opening 18, as shown in FIG. 14. It will be appreciated that the shutter blade 18 has similar partially covered positions upon its return stroke from the uncoyered position. These partially covered positions defines a relatively small aperture for exposing the film.

Operationally, this third embodiment is similar to the first two embodiments except that the slidable plate 22 is not employed. When a picture is taken e picture taking mechanism is operated and the striker (not shown) contacts the shutter blade 18 to cause the shutter blade 18 to rotate in the clockwise direction against the biasing of the shutter spring 36 from the covered position shown in FIG. 12. As the shutter blade 18 rotates, which is shown in FIG. 13, the partially uncovered position is obtained in which the end 78 of the slot 72 is disposed over the shutter opening 17 and light is transmitted through the shutter opening 17. This partially covered position defines a smaller aperture through which film can be exposed. As rotation of the shutter blade 18 continues and the end 78 of the slot 72 is no longer disposed over the shutter opening 17, more light is emitted through the shutter opening 17 to expose the film, as shown in FIG. 14.

Figure 15:
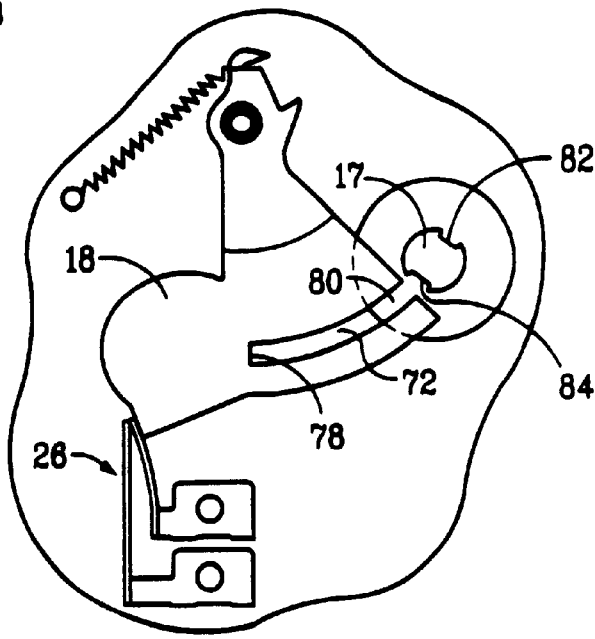
FIG. 15 is a diagrammatical view of the embodiment of FIG. 11 with the shutter blade in the uncovered position.

Eventually, second end 80 of the slot 72 passes over the shutter opening 17 and the shutter blade 18 rotates to the uncovered position, as shown in FIG. 15. Upon reaching the uncovered position, the shutter blade 18 urges the flash contacts 26 together, as best seen in FIG. 15, to trigger the electrical circuit and fire the flash, in the event that the flash is being utilized. Once fired, the flash will illuminate and light from the flash will enter the uncovered shutter opening 17 or larger aperture for exposing the film.

While the shutter blade 18 is in the uncovered position, the shutter blade 18 is forced to rotate counter clockwise due to the biasing of the spring 36. This is referred to as the return stroke of the shutter blade. As the shutter blade rotates back to th covered position, the contacts 26 return to the open position. Further, as the shutter blade 18 rotates over the shutter opening 17 and the second end 80 of the slot 72 passes over the shutter opening 17, the shutter blade returns to the partially covered position. Continued rotation of the shutter blade 18 causes the first end 78 of the slot 72 to pass over the shutter opening 17. Eventually, the shutter blade 18 rotates to the covered position, in which the shutter opening 17 is covered to prevent light from exposing the film.

The shutter blade 18 rotates at the same speed and operates the same with and without a flash. If the flash is employed, the flash will illuminate when the shutter blade 18 has reached the uncovered position shown in FIG. 15, so that maximum light from the flash can pass through the shutter opening 17 to expose the film. When the flash is employed, the shutter blade moves at the same speed and the same size apertures are created by the shutter blade to expose the film, as compared to taking a picture without a flash.

FIG. 16 graphically illustrates the operation of the third preferred embodiment and its waveform. The vertical axis is the light level, and the horizontal axis is time. The position of the shutter blade with respect to the shutter opening is depicted at various times along the horizontal axis. As is evident by comparing FIG. 6 with FIG. 16, the shutter waveforms are the same in each embodiment. The light levels may be different, but each embodiment provides the same shutter waveform when a flash is used and when a flash is not used. This is because in each embodiment the shutter moves at the same speed and the film is exposed through the same size apertures when the flash is and is not utilized.

In further detail, at time $t_0$, the camera components are in the position shown in FIG. 13 and the shutter opening 17 is covered, by the interior portion 75. As a picture is taken, the shutter blade 18 begins to rotate at time to from the position shown in FIG. 12 to the partially covered position shown in FIG. 13. In this partially covered position, light is emitted though the aperture created by the slot 72 passing over the shutter opening 17. As the first end 78 of the slot 72 passes over the shutter opening 17, the aperture through which film is exposed becomes increasingly larger to pass an increasingly larger amount of light through the shutter opening 17. This is represented graphically by the line $L_1$.

At time $t_1$ the slot 72 covers the shutter opening 17. Once the slot 72 is disposed over the shutter opening 17 as shown in FIG. 14, the size of aperture defined by the slot 72 and the shutter opening 17 though which light is emitted to expose the film remains constant until the second end 80 passes over the shutter opening 17. Since the size of the aperture defined by the slot 72 and the shutter opening 17 remains constant during this time, the level of light to which the film is exposed remains constant (assuming a constant ambient level of light). This is represented graphically by the line $L_2$.

When time $t_2$ is reached, the second end 80 of the slot passes over the shutter opening 17, thereby increasing the size of the aperture through which light is emitted until the uncovered position is reached. Graphically, this is represented by the line $L_3$ from the time $t_2$ until the time $t_3$. Between time $t_3$ and time $t_4$ the shutter opening 17 is uncovered, as shown in FIG. 15, and the light level passed through the shutter opening 17 is at a maximum. If the flash is employed, it is during this time period that the flash illuminates. This is represented graphically as the horizontal line $L_4$.

Midway between time $t_3$ and time $t_4$, the shutter blade 18 begins its return stroke, which is a mirror image of its initial stroke. Line $L_5$ between time $t_4$ and time $t_5$ represents the second end 80 covering the shutter opening 17 during the return stroke until the shutter opening 17 is completely covered by the slot 72, as shown in FIG. 14. During this time period, the line $L_5$ is sloped downward to represent the amount of light passing through the shutter opening 17 decreasing due to the shutter blade 18 covering portions of the shutter opening 17. From time $t_5$ until time $t_6$ the light level remains constant as the aperture defined by the slot 72 passing over the shutter opening 17 remains constant in size, as shown in FIG. 14.

Upon reaching time $t_6$ the first end 78 of the slot 72 begins to pass over the shutter opening, thereby decreasing the size of the aperture. This is represented by the line $L_7$ which extends downward until time $t_7$. At time $t_7$ the shutter blade has returned to the covered position shown in FIG. 13 and the picture taking sequence has been completed.

In a preferred embodiment, the level of light through which the film is exposed as the slot 72 is disposed over the shutter opening 17 is f/11. In this preferred embodiment, when the shutter opening is uncovered, the aperture of the lens in this moment is about f/6.6. These numerical specifications are provided by way of example, and not by way of limitation. Of course, these levels may vary without deviating from the scope of this invention.

In summary, the third embodiment of this invention provides a shutter system that exhibits the same shutter waveform when a picture is taken with and without a flash. In this embodiment, the shutter blade has a radial slot 72, which is used to create the shutter waveform.

CONCLUSION

Described above are three embodiments of an improved shutter system 12 of this invention that exhibit the same waveform when taking a picture with and without a flash. These shutter systems 12 each have a shutter blade 18 that moves at a constant speed when a flash is used and when a flash is not employed. The speed of the shutter blade 18 is the same when the flash is used and when a flash is not used. In addition, film is exposed through the same size apertures when the flash is and is not used.

Each of the embodiments above creates an effective aperture for exposing the film while utilizing a shutter blade 18 that moves at a constant speed. This effective aperture can be used to take pictures with and without a flash with a shutter blade 18 that moves at the same speed. The effective aperture, as used herein, is defined as the opening or hole through which light passes to expose film during the entire film exposure sequence.

In each of the embodiments, the effective aperture vanes in size while the picture is being taken. In the first two embodiments, the effective aperture is defined by the first aperture 52 and the second aperture 54 of the sliding plate 22, the mask 21 and the shutter opening 17. Before the sliding plate moves, the effective aperture is shown in FIG. 3 and is defined by the first aperture 52 and the mask 21. In particular, the first aperture 52 and the second portion 45 of the mask are aligned to define the effective aperture. This occurs because the second portion 45 of the mask preferably is curved about a radius that is the same as the radius that defines the first aperture 52 of the sliding plate 22. This is best understood with reference to FIGS. 2–4. As shown, when the slidable plate 22 is disposed in the first position, the first aperture 52 and the second portion 45 are aligned, so as to limit the light entering the camera to expose the film.

As the slidable plate 22 of the first two embodiments moves and the second aperture 54 becomes disposed over the mask 21, the size of the effective aperture increases, as is understood by examining FIGS. 4 and 5. When the second aperture 54 is disposed over the mask 21, as shown in FIG. 5, connecting portions 45a and the second portion 45 of the mask 21 limit the amount of light entering the camera. Since the effective aperture is larger in size while the plate 22 is in the second position, the effective aperture is larger when the flash is triggered to emit sufficient light from the flash to expose the film when the flash is needed. Thus, while the slidable plate is in the second position, the effective aperture is larger than the effective aperture created while the plate 22 is in the first position.

In the third embodiment, the effective aperture is created by the slot 72 in the slidable plate and the shutter opening 17. As the slot 72 passes over the shutter opening 17, the slot 72 and the first indentation 82 of the shutter opening 17 define the effective aperture, as shown in FIG. 13. The size of the effective aperture increases as the slot 72 passes over the shutter opening 17 until the slot 72 reaches the second indentation 84. After passing by the second indentation 84, the effective aperture has the size shown in FIG. 14. Eventually, the second end of the slot 72 passes over the shutter opening 17, and the size of the effective aperture again increases. Once the second end of the slot 72 passes over the shutter opening 17, as shown in FIG. 15, the effective aperture is defined by the shutter opening 17 and is at its maximum size. At this point the flash, if employed, is triggered. It will be appreciated that the effective aperture decreases in size as the shutter blade 18 moves on its return stroke.

Thus, the camera of this invention provides apertures through which light is transmitted to expose film. The apertures can be used with a shutter blade that moves at a constant speed and at the same speed when a flash is used and not used. The larger sized aperture is used when the flash is illuminated. The camera of this invention employs a two step exposure and a constant shutter speed system that is relatively economical and that produces relatively good quality pictures when taking pictures indoors and outdoors. The smaller aperture is advantageous for outdoor pictures, while the larger aperture is advantageous when using a flash. Neither, however, detracts significantly from the quality of exposures when its use is not desired. For example, when a flash is employed and exposure through the larger aperture is not needed, the exposure through larger aperture will not significantly degrade the quality of the exposure. Similarly, when a flash is needed and exposure through the smaller aperture is not needed, the exposure through the smaller aperture will not significantly degrade the quality of the exposure.

It is to be understood, however, that even though numerous characteristics and advantages of the present invention have been set forth in the foregoing description, together with details of the structure and function of the invention, the disclosure is illustrative only and changes may be made in detail, especially in matters of size, shape and arrangement of parts within the principles of the invention to the full extent indicated by the broad general meaning of the terms in which the appended claims are expressed.

REFERENCE LIST

10 CAMERA
12 SHUTTER SYSTEM
14 FLASH
16 MAIN BODY
17 SHUTTER OPENING
18 SHUTTER BLADE
20 MASK
21 FIRST LENS
22 SLIDING PLATE
24 SECOND LENS
26 FLASH CONTACTS
28 LEVER
30 PIVOT POINT OF SHUTTER BLADE
32 FINGER OF SHUTTER BLADE
34 HOOK OF SHUTTER BLADE
36 SPRING
38 END OF SHUTTER BLADE ENGAGED BY STRIKER
40 RIDGES OF FIRST LENS
42 APERTURE OF MASK
44 FIRST PORTION
45 SECOND PORTION
45A CONNECTING PORTIONS
46 LEVER PIN
48 PLATE HOLE
50 CUT OUT STRUCTURE
52 FIRST APERTURE
54 SECOND APERTURE
56 FIRST END OF FLASH CONTACTS
58 SECOND END OF FLASH CONTACTS
60 CAVITY IN LEVER
62 MEMBER OF MAIN BODY
64 LEVER FINGER
66 EXTENSION
68 EXTENSION TAB
70 SLOT IN PLATE
72 SLOT
74 PERIPHERAL EDGE
76 INTERIOR OF SHUTTER BLADE
78 FIRST END OF SLOT
80 SECOND END OF SLOT
82 FIRST INDENTATION OF SHUTTER OPENING
84 SECOND INDENTATION OF SHUTTER OPENING

What is claimed is:

1. A camera, comprising:
a main body having a shutter opening disposed within the main body through which light can be transmitted to expose film;
a flash, coupled to the main body;
a pair of flash contacts, mounted to the main body and coupled to the flash, that are moveable between an open position in which a trigger signal is not provided to the flash and a closed position in which the trigger signal is provided to the flash;
a moveable plate, linked to the flash contacts and having a first aperture and a second aperture through which light can be transmitted, the firs aperture being smaller in size then the second aperture, the sliding plate being moveable between a first position, in which light is transmitted through the first aperture and the shutter opening to expose the film to a first level of light, and a second position in which the second aperture is disposed over the shutter opening so that light is transmitted through the second aperture and the shutter opening at a second level of light; and
a shutter blade, rotatably mounted to the main body to move between a covered position, in which the shutter blade is disposed over the shutter opening, and an uncovered position, in which the shutter blade is not disposed over the shutter opening, wherein the flash contacts are in the open position and the plate is in the first position when the shutter blade is in the covered position and the flash contacts are urged to the closed position and the plate to the second position as the shutter blade rotates to the uncovered position.

2. The camera of claim 1, wherein the sliding plate is in the second position when the flash illuminates.

3. The camera of claim 1, further comprising a first s disposed between the plate and the shutter opening.

4. The camera of claim 3, further comprising a second lens disposed over the sliding plate, so that light can be transmitted through the second lens to the sliding plate.

5. The camera of claim 1, further comprising a mask, disposed between the plate and the shutter opening.

6. The camera of claim 5, wherein the mask is aligned with the first aperture of the slidable plate when the plate is in the first position to define an effective aperture through which light is transmitted to expose the film, a size of the effective aperture increasing as the plate moves from the first position to the second position.

7. The camera of claim 6, wherein the mask further comprises a first portion that combines with the first aperture to define the size of the effective aperture when the plate is in the first position and a second portion that combines with the second aperture to define the size of the effective aperture when the plate is in the second position.

8. The camera of claim 1, further comprising a lever, coupled to the flash contacts and the sliding plate, the lever being rotatably mounted between a first position when the contacts are in the open position and the sliding plate is in the first position, and a second position, in response to the shutter blade moving to the uncovered position to thereby urge the flash contacts to the closed position and move the sliding plate to the second position.

9. The camera of claim 1, wherein the camera is a single-use camera.

10. The camera of claim 1, wherein the shutter blade moves at the same speed when the flash is employed and when the flash is not employed by a camera user.

11. A camera, comprising:
a main body, having a shutter opening, through which light can be transmitted to expose film;
a mask, disposed over the shutter opening, through which light can be transmitted to expose the film;
a shutter blade, rotatably mounted to the camera, and having a covered position in which the shutter blade is disposed between the shutter opening and the mask to prevent light from being transmitted through the shutter opening to expose the film and an open position in which the shutter blade is not disposed between the shutter opening and the mask so that light can be transmitted through the shutter opening to expose the film;

a flash, mounted on the camera, and operative to be activated by the shutter blade when the shutter blade is in the open position;

a moveable plate, coupled to the shutter blade, the plate having a first aperture and a second aperture, the first aperture being smaller than the second aperture, the plate being in a first position, in which the first aperture is disposed proximal to the mask and through which light at a first level can be transmitted to the shutter opening, when the shutter blade is in the covered position and being moveable to a second position, in which the second aperture is disposed proximal to the mask to transmit light at a second level to the shutter opening, in response to the shutter blade moving to the uncovered position.

12. The camera of claim 11, further comprising a first shutter lens mounted to the camera between the shutter blade and the moveable plate.

13. The camera of claim 12, further comprising a second shutter lens disposed over the sliding plate, so that light can be transmitted through the second shutter lens to the sliding plate.

14. The camera of claim 11, further comprising a pair of flash contacts, mounted to the main body and coupled to the flash, that have an open position and a closed position in which the trigger signal is provided to the flash, the flash contacts being in the open position when the shutter blade is in the covered position and being operative to move to a closed position in response to movement of the shutter blade to the uncovered position.

15. The camera of claim 14, wherein the plate is coupled to the pair of contacts, so that when the shutter blade moves to the uncovered position, the shutter blade urges the contacts to move to the closed position and the plate to the second position.

16. The camera of claim 15, further comprising a lever, coupled to the flash contacts and the sliding plate, the lever being rotatably mounted between a first rotatable position and a second rotatable position and being in the first rotatable position when the contacts are in the open position and the sliding plate is in the first position and being operative to move to the second rotatable position, in response to the shutter blade urging the flash contacts to the closed position and thereby moving the sliding plate to the second position.

17. The camera of claim 11, wherein the camera is a single-use camera.

18. A camera, comprising:

a main body, that has a shutter opening, through which light can be transmitted to expose film;

a flash coupled to the main body;

a picture taking mechanism, coupled to the main body, that can be manipulated to take a picture;

a first lens, disposed in a front of the camera, through which light can be transmitted to the shutter opening;

a shutter blade, rotatably mounted to the camera and having a covered position in which the shutter blade is disposed over the shutter opening to prevent light from being transmitted through the shutter opening to expose the film and In uncovered position in which the shutter blade is not disposed over the shutter opening so that light can be transmitted through the shutter opening, the shutter blade moving in response to manipulation of the picture taking mechanism; and a moveable plate, coupled to the shutter blade and disposed between the shutter opening and the first lens, the plate having a first aperture and a second aperture, the first aperture being smaller than the second aperture, the plate being in a first position, in which the first aperture is disposed between the first lens and the shutter opening and through which light at a first level can be transmitted to the shutter opening, when the shutter blade is in the covered position, and being moveable to an second position, in which the second aperture is disposed between the first lens and the shutter opening to transmit light at a second level to the shutter opening, in response to the shutter blade moving to the uncovered position, the plate transmitting light through the first aperture and the second aperture for the same amount of time when a flash is used and when a flash is not used.

19. The camera of claim 18, further comprising a mask, disposed over the shutter opening, through which light can be transmitted to expose the film.

20. The camera of claim 18, wherein the camera is a single-use camera.

21. The camera of claim 18, wherein the flash is operative to be activated by the shutter blade when the shutter blade is in the uncovered position.

22. The camera of claim 18, further comprising a pair of flash contacts, mounted to the main body and coupled to the flash, that have an open position and a closed position in which a trigger signal is provided to the flash, the flash contacts being in the open position when the shutter blade is in the covered position and moving to a closed position in response to movement of the shutter blade to the uncovered position.

23. The camera of claim 22, wherein the plate is coupled to the pair of contacts, so that when the shutter blade moves to the open position, the shutter blade urges the contacts to move to the open position and thereby move the plate to the second position.

24. The camera of claim 23, further comprising a lever, coupled to the flash contacts and the plate, the lever being rotatably mounted between a first rotatable position and a second rotatable position and being in the first rotatable position when the contacts are in the open position and the plate is in the first position and being operative to move to the second rotatable position, in response to the shutter blade urging the flash contacts to the closed position and thereby move the plate to the second position.

25. The camera of claim 18, further comprising a second shutter lens disposed over the plate, so that light can be transmitted through the second shutter lens to the plate.

26. The camera of claim 18, wherein the shutter blade moves at the same speed when the flash is used and when the flash is not used.

27. A camera, comprising:

a main body, that has a shutter opening, through which light can be transmitted to expose film, the shutter opening comprising an arcuate portion, a first indentation and a second indentation;

a shutter blade, rotatably mounted to the main body and having a curved slot disposed in the shutter blade, the curved slot extending along an arc from a periphery of the shutter blade in a direction of rotational travel of the shutter blade, the shutter blade being rotatable from a covered position, in which the shutter blade covers the shutter opening to an uncovered position, in which the shutter blades uncovers the shutter opening when a picture is taken with and without employing a camera flash, the shutter blade rotating the slot over the first indentation, the shutter opening, and the second indentation as the shutter blade rotates from the covered position to the uncovered position to emit light through the shutter opening to expose the film.

28. The camera of claim 27, further comprising a pair of flash contacts that are normally opened, and wherein the shutter blade contacts the flash contacts to urge the flash contacts to a closed position to fire the flash when the shutter blade rotates to the uncovered position.

29. The camera of claim 28, wherein the flash contacts comprise leaf springs that are spring biased to the open position.

30. The camera of claim 27, wherein the curved slot comprises a first end that is disposed in an interior portion of the shutter blade and a second end that is disposed on a peripheral edge of the shutter blade.

31. The camera of claim 30, wherein the slot first end passes over the first indentation, over the shutter opening and over the second indentation prior to the second slot end passing over the first indentation, over the shutter opening and over the second indentation as the shutter blade rotates.

32. The camera of claim 27, further comprising a spring that is coupled to the shutter blade to bias the shutter blade to the covered position.

33. The camera of claim 27, wherein the shutter blade rotates at the same speed when a flash is used and when a flash is not used.

* * * * *

UNITED STATES PATENT AND TRADEMARK OFFICE
CERTIFICATE OF CORRECTION

PATENT NO. : 6,418,278 B1
DATED : July 9, 2002
INVENTOR(S) : Wilfried Bittner

It is certified that error appears in the above-identified patent and that said Letters Patent is hereby corrected as shown below:

<u>Column 11,</u>
Line 53, please delete "uncoyered" and insert therefore -- uncovered --;

<u>Column 16,</u>
Line 1, please delete "firs" and insert therefore -- first --;

Signed and Sealed this

Fourteenth Day of October, 2003

JAMES E. ROGAN
*Director of the United States Patent and Trademark Office*